United States Patent [19]

Johnston et al.

[11] Patent Number: 4,836,347
[45] Date of Patent: Jun. 6, 1989

[54] ROLLER CLUTCH WITH ROLLER SPIN CONTROL

[75] Inventors: Albert D. Johnston, Huron; Frederick E. Lederman, Sandusky, both of Ohio

[73] Assignee: General Motors Corporation, Detroit, Mich.

[21] Appl. No.: 238,793

[22] Filed: Aug. 31, 1988

[51] Int. Cl.⁴ .................. F16D 41/06; F16D 15/00
[52] U.S. Cl. .................... 192/45; 192/41 R; 188/82.84
[58] Field of Search .......... 192/41 R, 44, 45; 188/82.84

[56] References Cited

U.S. PATENT DOCUMENTS

| 2,044,197 | 1/1935 | Barthel | 192/45 |
| 3,942,616 | 3/1976 | Elmore | 192/45 |
| 4,415,072 | 11/1983 | Shoji et al. | 192/45 |
| 4,549,638 | 10/1985 | Johnston | 192/45 |

Primary Examiner—Rodney H. Bonck
Assistant Examiner—Andrea Pitts
Attorney, Agent, or Firm—Patrick M. Griffin

[57] ABSTRACT

A ratchet device is provided in a roller clutch that acts between the ends of the rollers so as to allow the rollers to turn only in the wind up direction, thereby allowing quick change from overrun to lock up, but preventing roller spin and cam wear curing overrun.

3 Claims, 4 Drawing Sheets

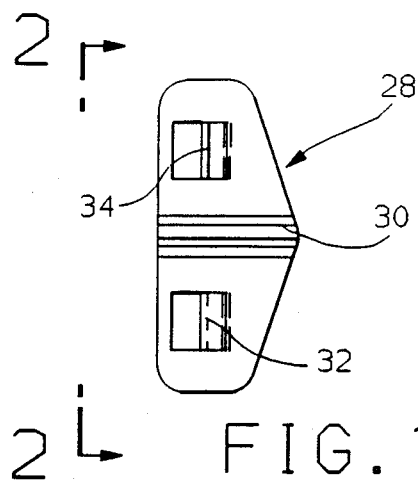
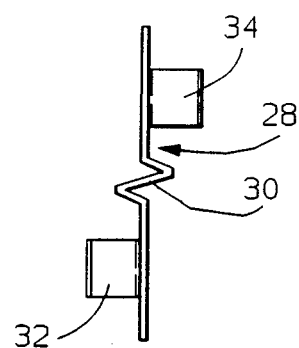
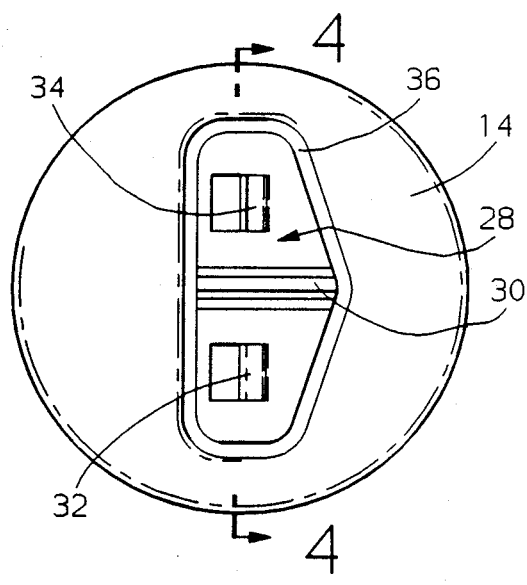
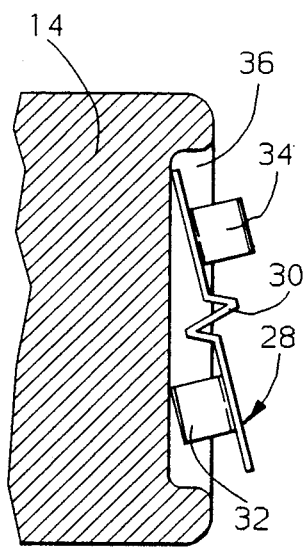
FIG. 1
FIG. 2
FIG. 3
FIG. 4

ROLLER CLUTCH WITH ROLLER SPIN CONTROL

This invention relates to overrunning roller clutches in general, and specifically to such a clutch in which the rollers are allowed to rotate freely in only one direction relative to the clutch cage, so as to prevent roller spin and cam wear during clutch overrun.

BACKGROUND OF THE INVENTION

Overrunning clutches are widely used, especially in automatic transmissions, to allow selective relative rotation between a pair of inner and outer coaxial clutch races. One clutch race has a cylindrical surface, which is generally referred to as the pathway, so the race itself may be referred to variously as the ring, pathway, or pathway race. The other race has an inner surface that includes a series of evenly circumferentially spaced and sloped cam ramps. Either the inner or the outer race may be the cam race. In either case, the cam ramps face the pathway, creating wedging pockets with a narrow and a wide end. A clutch cage is installed between the races, tied to and carried by the cam race. The cage retains a plurality of cylindrical rollers, locating one in each wedging pocket. Each roller is continually urged by an energizing spring toward the narrow end of the wedging pocket, and is thereby kept in continual contact with both the cam ramp and the pathway, which may termed the roller ready position.

In the transmission environment, various forces on the races will tend to rotate the races at various directions and speeds relative to ground, and in various directions relative to one another. However, given the continual spring bias of the rollers toward the narrow end of the wedging pocket, only selected relative rotation between the clutch races is possible. If the races tend to rotate in a relative direction that moves the rollers toward the wedging pockets' narrow end, they jam quickly between the pathway and cam ramps, and the races lock up. If the races tend to rotate in the opposite relative direction, that is, tending to move the rollers toward the wide end of the wedging pockets, the rollers slip between the pathway and the cam ramps, and the races can freely overrun. Theoretically, lock up and overrun depend only on the relative directions between the races, unaffected by the absolute speeds that the races are experiencing, that is, their speeds relative to ground. The absolute race speeds may vary widely from environment to environment. Likewise, theoretically, lock up and overrun do not depend on whether the outer or inner race is the cam race. As a practical matter, however, the behavior of the rollers is affected significantly by whether the roller carrying cam race is the outer or inner race, and by whether the absolute speed experienced by the cam race during overrun is small or great.

For example, in the case where the outer race is the cam race, if the outer cam race is also experiencing high speed during overrun, then the rollers are thrown centrifugally outwardly, tending to move away from the pathway, a phenomenon known as roller drift. If severe enough, the rollers may overpower the energizing springs and actually move physically away from the pathway, threatening the roller ready position necessary for quick lock up. The clutch shown in U.S. Pat. No. 4,549,638 to Johnston, assigned to the assignee of the present invention, is a response to the roller drift problem. In Johnston, the springs are mounted on weighted sliding blocks that shift opposite to the direction of roller drift, increasing the spring pressure on the rollers. If the outer cam race is not seeing high absolute speeds during overrun, roller drift is not a problem, but a different problem may manifest itself. The springs continually lightly load the rollers into the narrow end of the wedging pockets, against both the pathway and the cam ramps. Despite the light spring force, the pathway may be moving very rapidly relatively to the cam ramps. Traction of the pathway on the roller can cause the rollers to spin, rather than just slip on the pathway. As the roller changes from pure slipping to spinning, evenly distributed wear on the pathway is traded for potential localized wear on the cam ramps. This localized wear can affect the operation of the clutch by effectively changing the angle of slope of the cam ramps, known as the strut angle.

In the case where the inner race is the cam race, and the cam race is also seeing significant absolute speed during overrun, centrifugal force acts to throw the rollers even more strongly into the pathway, increasing the potential traction on the rollers. If the inner cam race does not see significant speed during overrun, centrifugal force won't increase traction. However, the energizing spring force can still cause pathway traction and roller spin, although it would not be as severe. So, to summarize, roller spin during overrun is a potential problem in every case, except where roller drift is significant enough to lessen the pathway traction.

The rollers do not slip, or spin, during lock up, of course. However, as the races attempt to reverse relative direction, changing from overrun to lockup, the rollers will be forced very strongly and very quickly toward the narrow end of the wedge. This can actually forcibly open the narrow end of the wedge a small amount. As this happens, the rollers will roll up the cam ramps a few degrees in the direction opposite to the direction in which they were spinning during overrun, a process known as roller windup. Although the rollers experience a lot of load during windup, they do not cause significant wear on the races, because they can roll freely.

The prior art recognizes the overrun roller spin and wear problem, in at least one instance. But the solution proposed there does not work well when it is most needed, that is, in the case where the inner race is the cam race and is moving fast during overrun. Furthermore, when the proposed solution would work well, it isn't needed in the first place, that is, in the case where the outer race is the cam race, and is moving fast during overrun. U.S. Pat. No. 2,044,197 to Barthel proposes biasing the rollers to ready position indirectly, by weighted blocks pivoted to the cam race in such a way as to pivot away from the rollers and reduce the spring pressure when the cam race is rotating at high speed. In its FIG. 1 embodiment, where the inner race is the cam race, the spring pressure would in fact be reduced, but nothing would prevent centrifugal force from throwing the rollers out into the pathway. In its FIG. 3 embodiment, where the outer race is the cam race, the spring pressure would also be reduced, but roller drift would already be acting to reduce pathway traction, anyway. And, in either embodiment, if the cam race were not moving at high speed, there would be no effect on spring pressure at all, as nothing would act to pivot the weights. In addition, the pivoted weights take up so much room between the races that the energizing springs are too small to be practical.

SUMMARY OF THE INVENTION

The invention provides a means of preventing roller spin and its consequent wear on the cam ramps that works regardless of which race is the cam race, and regardless of whether the cam race is rotating fast or slow during overrun.

In general, a ratchet means is provided that is selectively engageable between the rollers and the cage to allow them to spin only in the windup direction, but prevent them from spinning at all relative to the cage in the other direction. The rollers therefore, cannot spin relative to the cam ramps or cause rubbing wear on them during overrun. However, the rollers can freely rotate during windup, so as not to interfere with the change from overrun to lock up.

Specifically, in the preferred embodiment disclosed, the ends of the cylindrical rollers rest close to the inner surfaces of the side rails of a clutch cage. Each cage side rail has a circumferentially extending slot cut into it, long enough to cover the entire travel path followed by the roller duirng normal clutch operation. Each roller end has an inset that matches the shape of a pawl piece dropped into the inset. Each pawl piece has a sloped, resilient tab extending therefrom that flexes freely only toward the end of the roller. So, the tab will catch in the slot if the roller tends to rotate in its overrun spin direction. This prevents roller spin and wear during overrun. The tab freely ratchets past the slot during the change from overrun to lockup, so as not to interfere with roller windup.

It is, therefore, a general object of the invention to prevent roller spin and cam wear during clutch overrun.

It is another object of the invention to provide a roller clutch that prevents roller spin regardless of which race is the cam race, and regardless of its speed during overrun.

It is yet another object of the invention to selectively control roller spin with a ratchet means operable between the roller and the cage which will only allow the roller to turn freely in the windup direction, but which will prevent the roller from spinning in the other direction.

DESCRIPTION OF THE PREFERRED EMBODIMENT

These and other objects and features of the invention will appear from the following written description, and from the drawings, in which:

FIG. 1 is a side view of the pawl piece alone;

FIG. 2 is a view of the pawl piece from the perspective of the plane 2—2 in FIG. 1;

FIG. 3 is a view of the pawl piece dropped into the inset in the end of a roller, prior to the roller being installed in the clutch cage;

FIG. 4 is a sectional view of the end of the roller taken along the plane 4—4 of FIG. 3, and showing the pawl piece in elevation;

Figure 10:
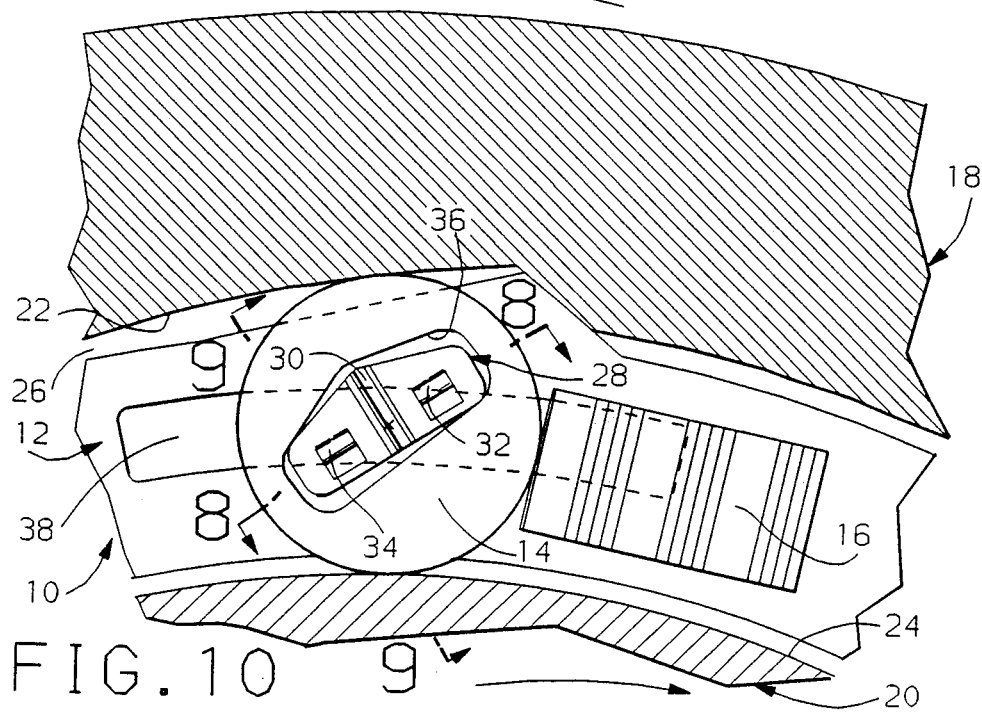
FIG. 10 is a sectional view of the races and clutch cage taken along the plane 10—10 of FIG. 9.

Referring first to FIG. 10, a preferred embodiment of the roller clutch of the invention, indicated generally at 10, has a cage comprised by a pair of spaced side rails 12, one of which is visible. The side rails 12 retain a plurality of cylindrical rollers 14 between them. Each roller 14 has an individual energizing spring 16 that biases it continually to the left, or counterclockwise. Clutch 10 is installed between a pair of clutch races, an outer cam race indicated generally at 18, and an inner ring indicated generally at 20. Cam race 18 has a series of cam ramps thereon, one of which is indicated at 22. The side rails 12 are shaped so as to fit closely to the cam ramps 22 when clutch 10 is installed. Ring 20 has a cylindrical inner surface providing a pathway 24. The races 18 and 20 would be maintained substantially coaxial to one another by separate bearing, which are not illustrated. The cam ramps 22 confront the pathway 24 to create a plurality of wedging pockets 26. Each wedging pocket has a narrow end at the left, a wide end at the right. A roller 14 is located in each wedging pocket 26, continually biased by a spring 16 toward the narrow end.

Still referring to FIG. 10, given the orientation of the wedging pockets 26, clutch 10 would lock the races 18 and 20 together should cam race 18 attempt to rotate clockwise relative to ring 20, or should ring 20 attempt to rotate counterclockwise relative to cam race 18, as those are the conditions that would tend to jam the rollers 14 into the narrow end of the wedging pockets 26. The races 18 and 20 can overrun in the reverse relative directions, which would tend to move rollers 14 toward the wide end of the wedging pockets 26. As far as absolute speeds, in the particular environment disclosed, cam race 18, which carries the rollers 14, would be slow or stationary during overrun, while ring 20 would rotate rapidly clockwise. So, roller drift would not be a problem. However, as the pathway 24 rotated toward the wide end of the pocket 26, clockwise, the rollers 14 would be subject to being spun by the traction of pathway 24 toward the wide end of the pockets 26, counterclockwise. This spinning of rollers 24 during overrun could potentially wear the cam ramps 22. At the transition from overrun to lock up, rollers 14 would wind up slightly in the opposite direction, rolling into the narrow end of the wedging pockets 26, clockwise from the point of view of FIG. 10.

Referring next to FIGS. 1 and 2, the invention provides a ratchet means that allows the rollers 14 to turn freely in the wind up direction, but which locks the rollers 14 to the cage side rails 12 if they attempt to turn in the opposite direction. In the preferred embodiment, the ratchet means includes a pair of pawl pieces, one of which is indicated generally at 28. Each pawl piece 28 is stamped of tough and resilient sheet metal with an asymmetrical outer shape and a central corrugation 30.

At each end of pawl piece 28, a pair of identical sloped tabs 32 and 34 are lanced out and extend out and down at the same angle, but in opposite directions. Tabs 32 and 34 can be flexed freely in, toward the ends of the roller 14, by the cage side rails 12, but cannot be flexed freely out, as will be described below.

Referring next to FIGS. 3 and 4, each end of each roller 14 is inset at 36 in a shape matching, but slightly larger than, the pawl piece 28, so that a pawl piece 28 may be dropped into each inset 36. Each inset 36 is axially aligned with the inset 36 in the other end of roller 14. Therefore, the matching asymmetrical shapes assure that pawl piece 28 will not turn within the inset 36, and that it will be oriented always the same relative to the ends of the rollers 14 and identically to the other pawl piece 28. The fact that a tab 32 and 34 extends out of each side assures that pawl piece 28 can be installed in either direction, with one tab, here 34, extending outboard of roller 14, and the other, 32, inboard. In the free state shown in FIG. 4, the inboard tab 32 and one end of pawl piece 28 will rest on the bottom of inset 36. The spacing between outboard tabs 34 and their free state, measured from end to end of roller 14, is slightly greater than the width between the inner surfaces of side rails 12.

Figure 6:
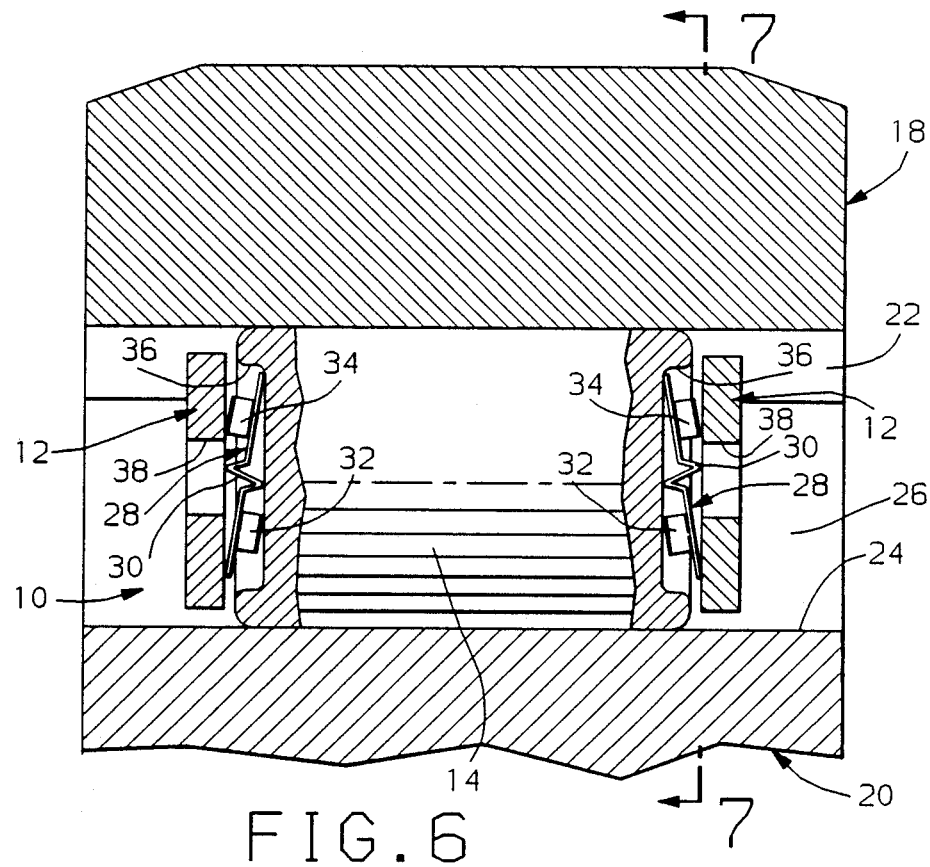
FIG. 6 is a sectional view of the races and clutch cage in lock up taken along the plane 6—6 of FIG. 7, and showing the roller in elevation with broken away ends.
Figure 9:
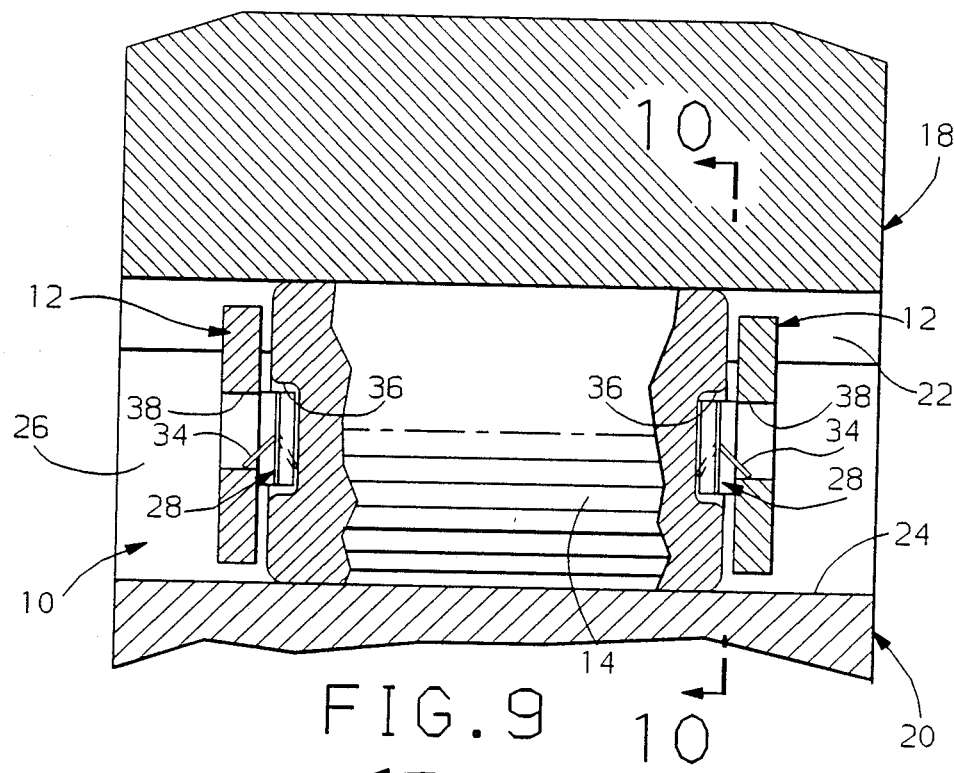
FIG. 9 is a sectional view of the roller and cage taken along the plane 9—9 of FIG. 10, showing most of the roller and the pawl piece in elevation.

Referring next to FIGS. 6 and 9, each side rail 12 also has a circumferentially extending slot 38 cut through it with a width greater than the length of tabs 34 and a length at least as great as the distance roller 14 would move during clutch operation. Given the relation between the free state spacing of the outboard tabs 34 and the width between the side rails 12 described above, roller 14 may be installed in the usual fashion, and the pawl pieces 28 will fit within space between the ends of the rollers 14 and the inside of the side rails 12 that would otherwise be unused. Specifically, when roller 14 is installed, the outboard tabs 34 may, as shown in FIG. 6, be compressed somewhat from their free state against the inner surfaces of the side rails 12. This will bring the inboard edge of the corrugation 30 down against the bottom of inset 36, which serves to keep the end of pawl piece from which outboard tab 34 is lanced elevated somewhat above the bottom of inset 36. Or, depending on the position to which roller 14 is turned at installation, the outboard tabs 34 may, as shown in FIG. 9, extend out freely into the slot 38. While each roller 14 may be in any position when it is first installed between the side rails 12, it will be understood that, if roller 14 were turned from its FIG. 9 position in one direction, clockwise as viewed from the 10—10 plane of FIG. 9, then the outboard tabs 34 could freely flex in toward the ends of the rollers 14 as they wiped past the upper edges of the side rail slots 38, allowing the rollers 14 turn freely. However, if the rollers 14 were turned in the opposite direction from their FIG. 6 position, counterclockwise as viewed from the 7—7 plane of FIG. 6, then the tabs 34 would spring out into a slot 38 and be stopped against the lower edge of side rail slot 38 after they had turned a few degrees.

Figure 8:
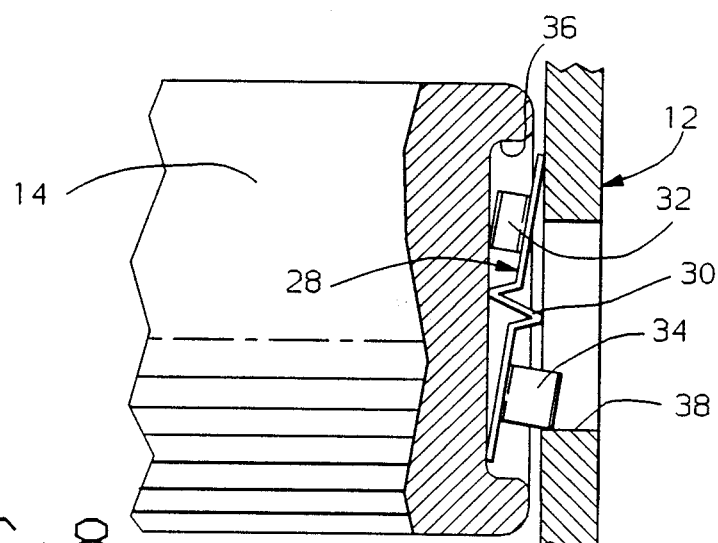
FIG. 8 is a sectional view of the roller and cage taken along the plane 8—8 of FIG. 10, showing most of the roller and the pawl piece in elevation.

Referring next to FIGS. 8, 9 and 10, the overrun mode of clutch 10 is indicated by the directional arrows on the races 18 and 20. Again, it should be kept in mind that the arrows represent relative direction only, and, in fact, the outer cam race 18 would be rotating very slowly or even be stationary, relative to ground. It will be noted from the relation between the outside edge of the pawl piece 28 and the inside edge of the inset 36 in FIG. 10 that roller 14 has, just prior, rotated in the counterclockwise direction. That is the direction that roller 14 would otherwise tend to spin during overrun. However, because the tabs 34 have caught and stopped on the lower edges of the side rail slots 38, the rollers 14 cannot turn farther. The pawl pieces 28, cooperating with the side rail slots 38, provide a one way clutch within a one way clutch, in effect, preventing the rollers 14 from turning just when the races 18 and 20 are allowed to turn. Therefore, roller spin during overrun and the consequent localized roller wear on the cam ramps 22 is prevented.

Figure 5:
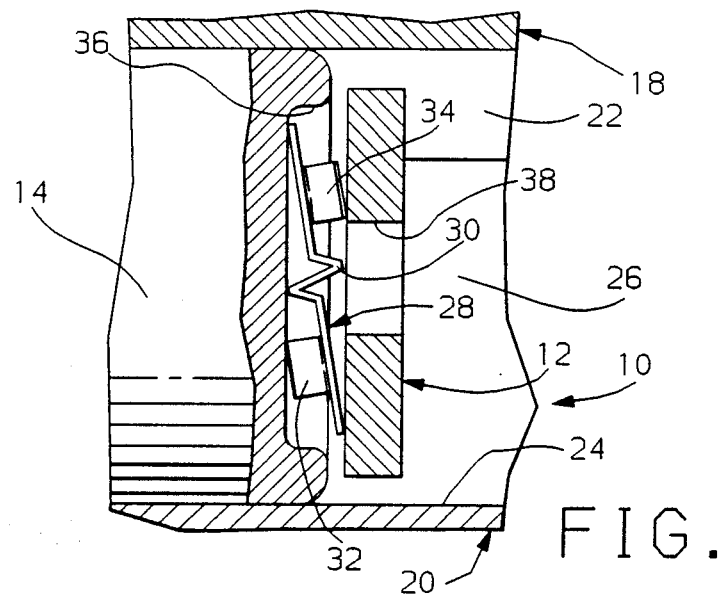
FIG. 5 is a view of the same end of the roller and pawl piece as in FIG. 4, but with all but the end of the roller in elevation and after the roller has been installed in the clutch cage and the clutch cage installed between the clutch races.
Figure 7:
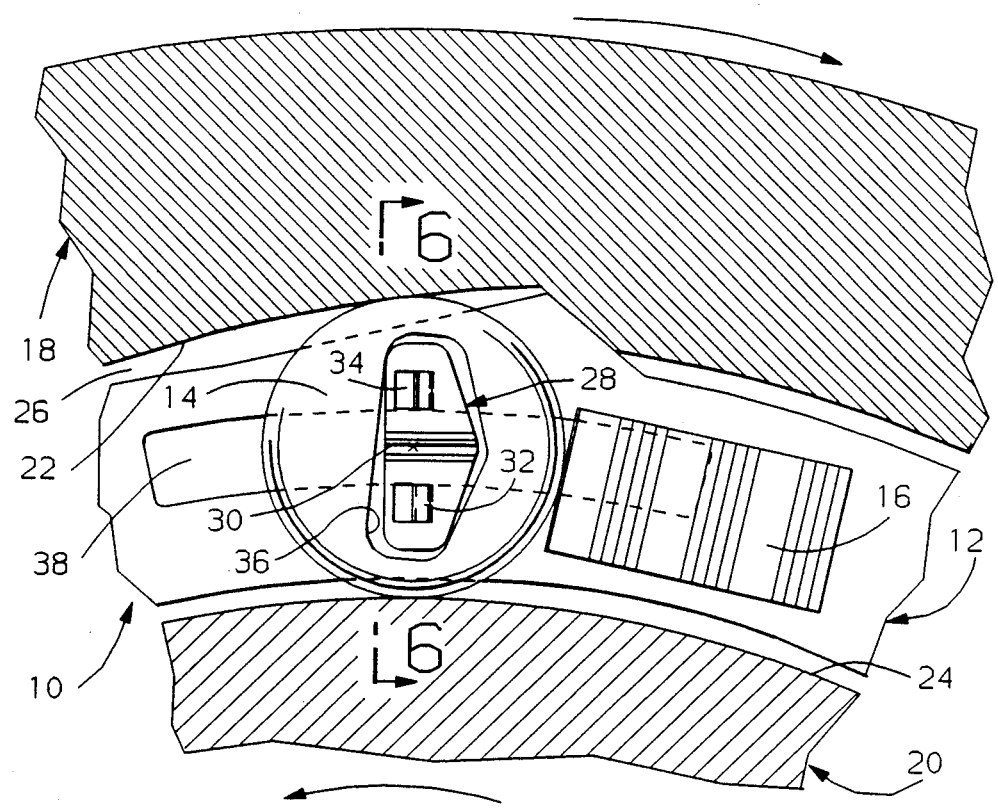
FIG. 7 is a sectional view of the races and clutch cage taken along the plane 7—7 of FIG. 6.

Referring next to FIGS. 5, 6 and 7, the lock up mode of clutch 10 is indicated by the directional arrows on the races 18 and 20. However, the arrows in FIG. 7 represent only the relative directions in which the races 18 and 20 are being forced, they do not relatively rotate after lock up. Although the rollers 14 are jammed and do not slide or spin at lock up, it will be noted from the relation between the outside edge of the pawl piece 28 and the inside edge of the inset 36 shown in FIG. 7 that roller 14 has, just prior, rotated in the clockwise direction, that is, in the direction that would otherwise turn during windup. The ratcheting of the tabs 34 allows the rollers 14 to freely wind up in that direction, so that change from overrun to lock up can occur just as in a conventional clutch. That is, the rollers 14 can freely roll toward the narrow ends of the wedging pockets 26 without dragging.

Variations of the preferred embodiment may be made. An inner cam race clutch would work, as well, and in fact represents the worst case of roller spin at overrun, at least when the inner cam race rotates at high absolute speeds. Variations of the ratchet means disclosed could be used, anything that would cooperate between the rollers and the cage side rails so as to allow roller rotation in the wind up direction only. For example, resilient tabs could be provided on the inner surfaces of the side rails. Slots, or some other stop member, could be provided on the end of the rollers. Flexible members could conceivably be provided directly on the ends of the rollers, rather than using a separate pawl piece like 28. A different form of the pawl piece 28 could be used, one that had a flat base and flexible tabs extending from only one side thereof. However, the particular pawl piece 28 has many practical advantages, including the fact that its side to side symmetry and perimeter asymmetry cooperate to prevent it from being incorrectly installed. The corrugation 30 keeps the outboard tab 34 elevated, so that it need not be as long as it would otherwise have to be in order to catch in the slot 38. Therefore, it will be understood that the invention is not intended to be limited to just the embodiment disclosed.

The embodiments of the invention in which an exclusive property or privilege is claimed are defined as follows:

1. In an overruning roller clutch of the type that has a clutch cage adapted to be fixed between a race with a cylindrical pathway and another race having a series of cam ramps confronting said pathway to form a plurality of wedging pockets with a wide end and a narrow end, and in which said cage locates a cylindrical roller in each of said pockets that is continually spring urged toward the narrow end of said wedging pocket, so as to alternately wedge between said pathway and cam ramps to lock up said races and slip between said pathway and cam ramps to allow said races to freely overrun, and in which said rollers tend to turn slightly in one circumferential direction toward the narrow end of said pockets as said clutch changes from overrun to lock up, the improvement comprising, ratchet means selectively engageable between each of said rollers and said cage that freely allows said rollers to rotate relative to said cage only in said one direction, thereby allowing said rollers to turn freely as they wedge between the pathway and cam ramps as the clutch changes from overrun to lock up, but preventing said rollers from spinning in the other direction and wearing said cam ramps during overrun.

2. In an overrunning roller clutch of the type that has a clutch cage adapted to be fixed between a race with a cylindrical pathway and another race having a series of cam ramps confronting said pathway to form a plurality of wedging pockets with a wide end and a narrow end, and in which said cage locates a cylindrical roller in each of said pockets that is continually spring urged toward the narrow end of said wedging pocket, so as to alternately wedge between said pathway and cam ramps to lock up said races and slip between said pathway and cam ramps to allow said races to freely overrun, and in which said rollers tend to turn slightly in one circumferential direction toward the narrow end of said pockets as said clutch changes from overrun to lock up, the improvement comprising, a flexible member extending from an end of each roller that can be flexed freely toward said end of said roller, but not away, and, a stop member on said cage that engages said flexible member so as to flex said flexible member toward said end of said roller when said roller turns in said one direction, but which engages said flexible member so as to tend to flex said flexible member away from said end of said roller when said roller turns in the other direction, whereby, said flexible member and stop member will allow said rollers to rotate freely relative to said cage only in said one direction, but prevent said rollers from turning in the other direction, thereby allowing said rollers to turn freely until they wedge between the pathway and cam ramps as the clutch changes from overrun to lock up, but preventing said rollers from spinning and wearing said cam ramps during overrun.

3. An overruning roller clutch of the type that is adapted to be installed between a first race with a cylindrical pathway and a second race having a series of cam ramps confronting said pathway to form a plurality of wedging pockets with a wide end and a narrow end, said roller clutch comprising, a clutch adapted to be fixed to said second race, said cage having a stop member thereon, a plurality of cylindrical rollers in said cage, one located in each of said wedging pockets with at least one roller end facing said stop member, said rollers further being continually urged toward the narrow end of said wedging pocket so as to alternately wedge between said pathway and cam ramps to lock up said races and slip between said pathway and cam ramps to allow said races to freely overrun, said rollers further tending to turn slightly in one circumferential direction toward the narrow end of said wedging pockets as said clutch changes from overrun to lock up, a flexible member extending from said one roller end that can be flexed freely toward said one end of said roller by said stop member, but not away, whereby, said flexible member and stop member will allow said rollers to rotate relative to said cage only in said one direction, but prevent said rollers from turning in the other direction, thereby allowing said rollers to turn freely until they wedge between the pathway and cam ramps as the clutch changes from overrun to lock up, but preventing said rollers from spinning and wearing said cam ramps during overrun.

* * * * *